May 7, 1963 R. C. WOODWARD, JR 3,088,326
MULTIPLE PULLEY VARIABLE RATIO TRANSMISSION
Filed Aug. 4, 1960 2 Sheets-Sheet 1

INVENTOR.
RICHARD C. WOODWARD, JR.
BY Flam and Flam
ATTORNEYS.

May 7, 1963  R. C. WOODWARD, JR  3,088,326
MULTIPLE PULLEY VARIABLE RATIO TRANSMISSION
Filed Aug. 4, 1960  2 Sheets-Sheet 2
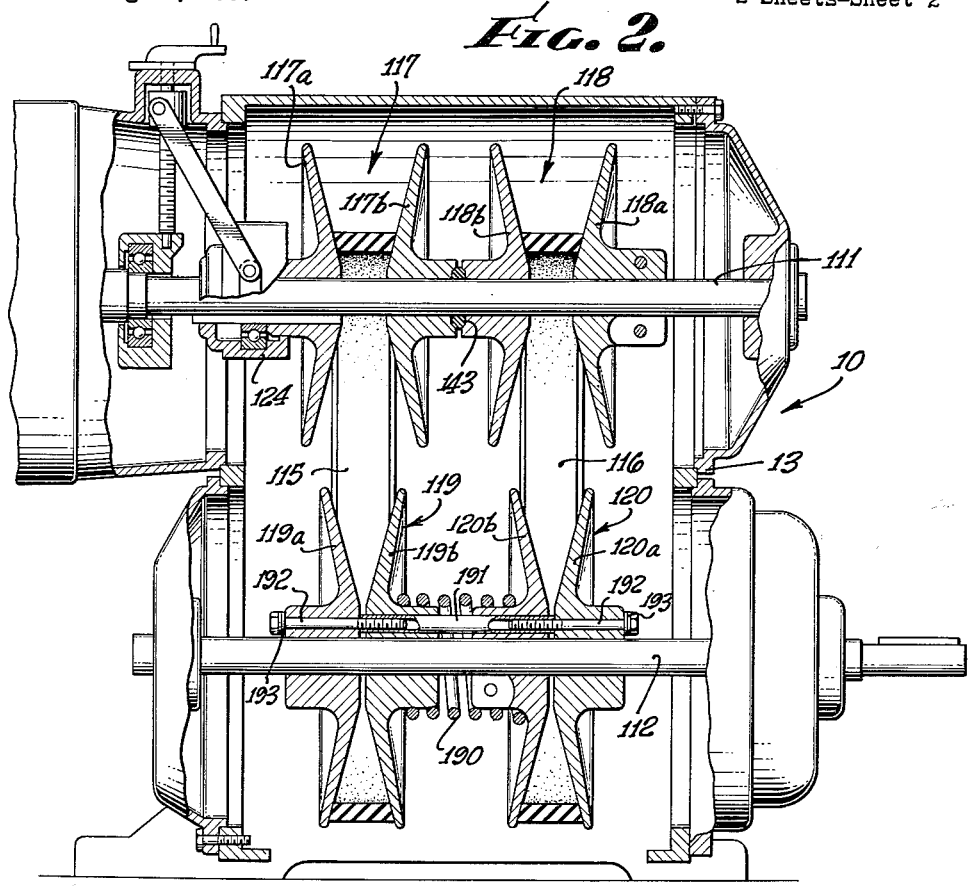
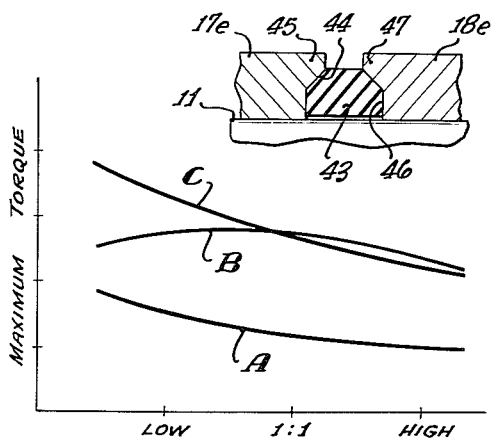
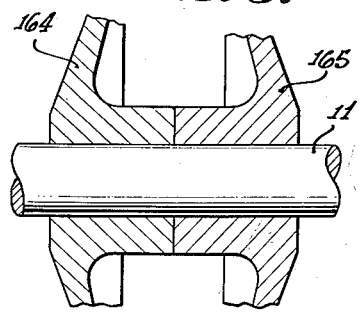
INVENTOR.
RICHARD C. WOODWARD, JR.
BY Flam and Flam
ATTORNEYS.

United States Patent Office 3,088,326
Patented May 7, 1963

3,088,326
MULTIPLE PULLEY VARIABLE RATIO
TRANSMISSION
Richard C. Woodward, Jr., Fullerton, Calif., assignor, by mesne assignments, to The Emerson Electric Manufacturing Company, St. Louis, Mo., a corporation of Missouri
Filed Aug. 4, 1960, Ser. No. 46,622
6 Claims. (Cl. 74—230.17)

This invention relates to a variable ratio transmission mechanism of the type utilizing a V-belt in cooperation with pulley structures of variable diameter. Each pulley comprises two coaxial sections having opposed diverging convex conical surfaces cooperable respectively with opposite sides of the belt. The sections are capable of relative axial movement so that the position of the belt from the axis is coordinated with the axial position of the sections.

It is frequently necessary and convenient for heavy loads to provide two belts for sharing the load transfer from driving shaft to driven shaft. In this case, two adjustable pulley structures are mounted on each shaft.

However, when heavy loads are imposed upon the output shaft, one of the belts usually tends to take a much larger share of the load than the other. The machine reaches its maximum torque at a value well below twice the maximum torque of a corresponding single belt machine. Furthermore, the belts tend to wear unequally as a result of such unequal torque distribution.

It has been proposed in the past to equalize the load between the belts by using an arrangement wherein a single axially floating member provides cone sections on opposite sides for engaging the respective belts. Axial components of belt force are necessarily equalized. Accordingly, and by virtue of symmetrical construction, the entire load on the two belts is equalized. Yet the power rating still is far from doubled and there is still a substantial disparity in load sharing.

The primary object of this invention is to improve the load sharing characteristics of the belts in a multiple belt variable ratio transmission. Friction between the floating member and the shaft along which it is adjustable tends to prevent the movement of the floating member requisite to accomplish load equalization. In order to accomplish more effective equalization of belt load, the friction forces are reduced or made insignificant with respect to the movement of the floating member. Thus, the floating member is split into two parts. Each part is capable of slgiht tilting movement by virtue of the existence of slight tolerances between it and the shaft. The sections "walk" or climb along the shaft without doing considerable work against friction. Hence, friction is effectively overcome. To ensure this movement of two halves of the floating member, a resilient spacer is preferably located between the otherwise engaging ends of the floating parts.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 1a is an enlarged fragmentary sectional view showing a portion of the apparatus of FIG. 1;

FIG. 2 is a view similar to FIG. 1, but illustrating the invention embodied in apparatus utilizing a different adjusting mechanism;

FIGS. 3, 4 and 5 are enlarged sectional views illustrating modified pulley structures; and FIG. 6 graphically depicts torque or maximum torque as a function of speed to illustrate the improved characteristics of the system.

Figure 1:
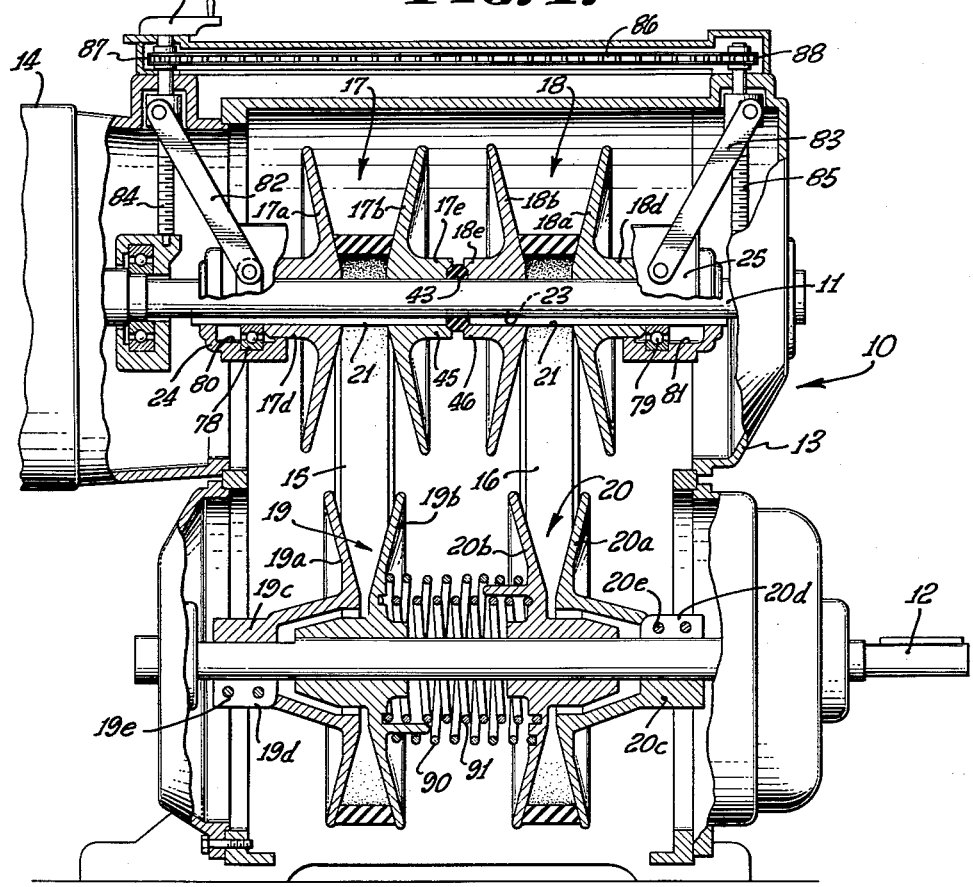
FIGURE 1 is a vertical sectional view of a variable speed transmission mechanism incorporating the present invention.

In FIG. 1 there is illustrated a transmission mechanism 10 having an input shaft 11 and an output shaft 12. The shafts 11 and 12 are mounted within a transmission casing 13 upon vertically spaced horizontal axes.

In the present instance the output shaft 12 projects outwardly at the lower right hand end of the casing for connection to the load, and a motor 14 for driving the input shaft 11 is affixed coaxially of the shaft 11 at the upper left hand end of the transmission casing 13.

The shafts 11 and 12 are connected together by two belts 15 and 16 and two sets of variable diameter pulley structures therefor. The belts operate in parallel, each transmitting its quota of torque from the driving shaft 11 to the driven shaft 12.

For the belt 15, a driving pulley 17 is provided, and for the belt 16, a driving pulley 18 is provided. The pulleys 17 and 18 are located in side by side relationship along the shaft 11.

The present transmission is of the type in which the driven pulley sections adjust automatically as the driving pulleys are adjusted, and maintain belt tension.

The pulley 17 includes two convex conical pulley sections, 17a and 17b, and the pulley 18 includes two convex conical sections, 18a and 18b. The pulley sections 17a and 17b have hubs 17d and 17e, and the pulley sections 18a and 18b have hub portions 18d and 18e. Two splines 21 accommodated in a groove 23 of the shaft couple the respective pulleys 17 and 18 to the shaft.

All of the pulley sections 17a, 17b, 18a and 18b are thus capable of axial adjustment along the shaft 11. However, for purposes of adjusting the effective diameters of the pulleys 17 and 18, the inner pulley sections 17b and 18b are intended to have only limited axial movement, as hereinafter explained, and the outer pulley sections 17a and 18a of the respective pulleys are intended to be shifted inwardly and outwardly with respect to the relatively fixed sections 17b and 18b. As the pulley sections 17a and 18a move inwardly, the belts 15 and 16 are forced upwardly along the conical faces of the sections 17a and 17b. The ratio of transmission is accordingly increased.

For moving the pulley sections 17a and 18a in unison, shifting collars 24 and 25 are provided. These shifting collars and the associated mechanism will be described more fully hereinafter.

The hubs 17e and 18e of the pulley sections 17b and 18b are separated by a resilient spacer ring 43. The spacer ring 43 on one side fits within a shallow recess 44 extending inwardly from the end surface of the hub 17e. A rim 45 formed by the recess 44 suitably holds the ring 43 in place. Correspondingly, the end surface of the hub 18e has a recess 46 forming a rim 47 that retains the ring 43 on the other side. The ring 43 has slight clearance with respect to the shaft 11.

Since the pulley sections 17b and 18b are slidable on the shaft 11, they will tend to move if there is any disparity in belt tension between the belts 15 and 16. Thus if the tension of belt 15 is greater than that of belt 16, the pulley sections will move to the right, thereby relieving the tension of belt 15 and increasing the tension of belt 16.

Movement is facilitated by virtue of the fact that the pulley sections 17b and 18b are separate. Thus, the hubs 17e and 18e are capable of tilting movement which ensures that they can creep by rocking along the shaft 11 and avoid what would be substantial frictional resistance to simple sliding movement. The spacer 43 holds the ends of the hubs 17e and 18e apart so that they do not bear against each other to impose added frictional restraint. Yet, at the same time the spacer 43 effectively transmits force between the pulleys sections 17b and 18b requisite to achieve the equalization.

Figure 3:
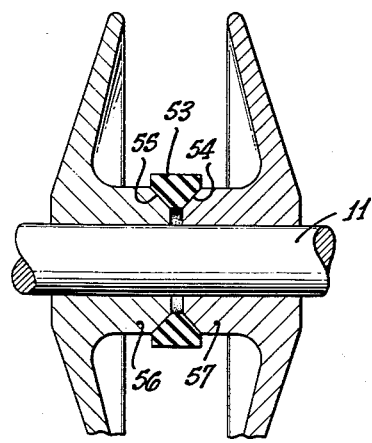

In FIG. 3 a slightly different spacer ring 53 is provided. The ring 53 has a cross-section that tapers, the convergence being in the direction of the axis of the ring 53. Thus, surfaces 54 and 55 on opposite sides of the ring are frusto-conically concave to receive the ends of the hubs 56 and 57 which are frusto-conically convex. The ring 53 is held in substantial spaced relationship with respect to the shaft 11.

Figure 4:
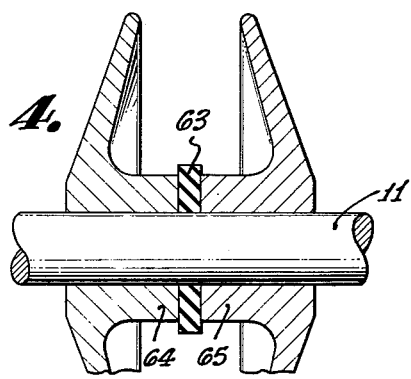

In FIG. 4 a simple flat ring 63 is provided that is interposed between the flat ends of the hubs 64 and 65. Even by this simple expedient, a substantial improvement in maximum torque is achieved.

In FIG. 5 two pulleys 164 and 165 similar to the pulleys of FIG. 4 having their hubs directly opposed to each other, there being no spacer ring.

In FIG. 6 there is illustrated a diagram of maximum torque plotted as a function of speed or transmission ratio. Graph A illustrates the characteristics of a machine utilizing one belt but otherwise having specifications corresponding to the device illustrated in FIG. 1. Graph B illustrates the characteristics of the pulleys of FIG. 5. At low speeds the engagement of the end surfaces of hubs 54 and 55 imposes some restraint against effective equalization of belt tensions, and the maximum torque is only slightly greater than the maximum torque of a single belt machine. Yet there is a substantial improvement, especially at high speeds. Graph C illustrates the characteristics of the machine disclosed in FIG. 1. The devices of FIGS. 3 and 4 have characteristics to those illustrated by graph C.

The shifting collars 24 and 25 (FIG. 1) mount bearing structures 78 and 79 respectively within internal recesses 80 and 81. The inner races of the bearings 78 and 79 are journalled upon the shaft 11 and abut the outer end surfaces of the hubs 17d and 18d. By virtue of this arrangement a force can be transmitted to the relatively movable pulley sections 17a and 18a while the collars themselves are non-rotary.

A non-rotary relationship is required in order to effect connections to an adjusting mechanism. For this purpose, links 82 and 83 are provided that at corresponding ends are pivoted to the collars. The other ends of the links move along lead screws 84 and 85. As the links 82 and 83 travel along the lead screws 84 and 85, the collars 24 and 25 are shifted to cause adjustment in the diameter of the pulleys.

The lead screws 84 and 85 and the collars 24 and 25 move in unison by virtue of a chain link 86 engaging sprocket wheels 87 and 88 respectively mounted upon the the lead screw shafts. A crank 89 connected to the shaft of one of the lead screws 84 rotates the lead screws 84 and 85 in unison.

The pulleys 19 and 20 of the driven shaft 12 each include two sections, 19a and 19b, and 20a and 20b. The outer sections 19a and 20a of each set occupy fixed positions along the driven shaft 12. The pulley sections 19a and 20a have hubs 19c and 20c split as at 19d and 20d whereby the hubs may be constricted about the shaft by draw screws 19e and 20e. The inner pulley sections 19b and 20b are axially adjustable. Springs 90 and 91 urge the sections 19b and 20b toward their respective companion pulley sections. This arrangement allows for proper belt movement. Thus, as the belts 15 and 16 at their upper ends are caused to travel radially along the faces of the relatively fixed driving pulley sections 17b and 18b, their lower ends travel radially along the faces of the fixed pulley sections 19a and 20a. The pulley sections 19b and 20b move accordingly under the influence of the springs 90 and 91.

In the form illustrated in FIG. 2, a slightly different arrangement is provided in that there is but a single adjusting collar 124. In this instance, the outer pulley section 118a of the pulley 118 is fixed upon the driving shaft 111, and the remaining pulley sections 118b, 117b and 117a move axially. The pulley section 118a is illustrated as having a split hub whereby it may be clamped to the shaft 111. The shifting collar 124 in this instance must move a distance twice that of each of the shifting collars 24 or 25 of the previous form in order to effect the same adjustment in transmission ratio.

When the pulley section 117a is moved toward the pulley section 118a, the intermediate pulley sections 117b and 118b, acting through resilient ring 143, serve equally to distribute the load between the belts 115 and 116.

The pulley structures 119 and 120 on the driven shaft 112 are of a construction slightly different than that of FIG. 1 to allow for the different mode of movement of the driving structures.

Thus the inner pulley section 120b of the set cooperable with belt 116 is axially fixed, so that the belt 116 shifts parallel to itself as it moves at upper and lower ends radially along the conical surfaces. The remaining pulley section 120a, and the sections 119a and 119b of the adjacent pulley set are all movable.

A series of equiangularly spaced rods, as at 191, extend through aligned apertures in the inner pulley sections 119b and 120b. Machine screws 192 extend through the outer pulley sections and are attached at their inner ends to the ends of the rods 191.

Resilient cushions 193 are interposed between the heads of the screws 192 and the end surfaces of the outer pulley sections whereby the outer sections 191a and 120a are resiliently urged together. The inner pulley sections 119b and 120b are resiliently urged apart by the aid of a coil spring 190 surrounding their hubs.

The separate floating pulley section arrangement can in a like manner be incorporated in variable ratio transmission of other types. They make practical for the first time variable ratio transmissions utilizing even more parallel operating belts.

The inventor claims:

1. In a variable ratio transmission mechanism: a shaft; a set of pulleys on the shaft; a belt for each pulley and having edges engaging the corresponding pulley; each of the pulleys having two separate sections so that the number of pulley sections is twice the number of belts or the number of pulleys; at least one of the pulley sections at one end of the set being movable along the shaft; the intermediate pulley sections of adjacent pulleys having opposed parts for transmission of axial movements therebetween; means for causing the intermediate pulley sections to rotate in synchronism; means for shifting the said one end pulley section toward and away from the other end pulley section whereby the effective diameters of the pulleys are varied; each of the intermediate pulley sections having sufficient clearance relative to the shaft for axial movement and independent tilting movement relative to the shaft.

2. In a variable ratio transmission mechanism: a shaft; a pair of pulleys on the shaft for cooperation with a pair of belts; each of the pulleys having an outer section and an inner section, the inner sections being opposed to and separate from each other; means for causing the inner sections to rotate in synchronism; at least one of said outer sections being movable along the length of the shaft; means for shifting said movable outer section whereby the effective pulley diameters of both pulleys may be varied; each of said inner pulley sections having sufficient clearance on the shaft for axial movement along the shaft and for slight, substantially independent tilting movement about the shaft; and means mutually transmitting axial movements of each inner pulley section to the other section.

3. In a variable ratio transmission mechanism: a shaft; a pair of pulleys on the shaft for cooperation with a pair of belts; each of the pulleys having an outer section and an inner section; means for causing the inner sections to rotate in synchronism; at least one of said outer sections being movable along the length of the shaft; and means for shifting said movable outer section whereby the effective pulley diameters of both pulleys may be varied; each of said inner pulley sections having sufficient clearance on the shaft for axial movement along the shaft and for slight tilting movement about the shaft; said inner pulley sections having hubs opposed to each other for transmitting axial movements of the pulley sections.

4. The combination as set forth in claim 3 together with a resilient ring surrounding the shaft and interposed between the hubs to maintain a substantially fixed spaced separation therebetween.

5. The combination as set forth in claim 3 together with a resilient ring surrounding the shaft and interposed between the hubs to maintain a substantially fixed spaced separation therebetween; said hubs providing recesses receiving opposite sides of the resilient ring.

6. The combination as set forth in claim 3 together with a resilient ring surrounding the shaft and interposed between the hubs to maintain a substantially fixed spaced separation therebetween; said hubs having convex conical surfaces at their ends fitting the edges at the ring aperture to hold the ring out of contact from the shaft.

References Cited in the file of this patent
UNITED STATES PATENTS

| | | |
|---|---|---|
| 1,819,227 | Chorlton | Aug. 18, 1931 |
| 2,513,657 | Lindner | July 4, 1950 |
| 2,623,400 | Davis | Dec. 30, 1952 |

FOREIGN PATENTS

| | | |
|---|---|---|
| 337,284 | France | Apr. 2, 1904 |
| 325,116 | Germany | Sept. 9, 1920 |